(12) United States Patent
Kwak

(10) Patent No.: US 11,888,182 B2
(45) Date of Patent: Jan. 30, 2024

(54) SECONDARY CELL

(71) Applicant: Northvolt AB, Stockholm (SE)

(72) Inventor: Seungho Kwak, Stockholm (SE)

(73) Assignee: NORTHVOLT AB, Stockholm (SE)

( * ) Notice: Subject to any disclaimer, the term of this patent is extended or adjusted under 35 U.S.C. 154(b) by 0 days.

(21) Appl. No.: 17/898,021

(22) Filed: Aug. 29, 2022

(65) Prior Publication Data

US 2023/0066385 A1 Mar. 2, 2023

(30) Foreign Application Priority Data

Aug. 30, 2021 (SE) .................................. 2151084-7
Sep. 10, 2021 (SE) .................................. 2151119-1

(51) Int. Cl.
*H01M 50/538* (2021.01)
*H01M 50/593* (2021.01)
*H01M 10/04* (2006.01)

(52) U.S. Cl.
CPC ..... *H01M 50/538* (2021.01); *H01M 10/0431* (2013.01); *H01M 50/593* (2021.01)

(58) Field of Classification Search
CPC ............. H01M 50/538; H01M 50/593; H01M 10/0431
See application file for complete search history.

(56) References Cited

U.S. PATENT DOCUMENTS

| | | | | |
|---|---|---|---|---|
| 2003/0064285 A1* | 4/2003 | Kawamura | ......... | H01M 50/548 429/129 |
| 2006/0073382 A1 | 4/2006 | Urano et al. | | |
| 2012/0141850 A1 | 6/2012 | Jeong | | |
| 2016/0079584 A1 | 3/2016 | Lee et al. | | |
| 2020/0395579 A1* | 12/2020 | Ichinohashi | ...... | H01M 10/0413 |
| 2022/0037712 A1* | 2/2022 | Kritzer et al. | ...... | H01M 10/659 |
| 2022/0166094 A1* | 5/2022 | Ueda | ..................... | H01M 10/04 |

FOREIGN PATENT DOCUMENTS

| | | |
|---|---|---|
| CN | 208385543 U | 1/2019 |
| CN | 110085778 A | 8/2019 |
| CN | 112331973 A | 2/2021 |
| CN | 212571193 U | 2/2021 |

(Continued)

OTHER PUBLICATIONS

JP2019040678 translation (Year: 2019).*

(Continued)

*Primary Examiner* — Jane J Rhee
(74) *Attorney, Agent, or Firm* — Alston & Bird LLP

(57) ABSTRACT

A secondary cell is disclosed, comprising a first end plate and a second end plate. The first end plate comprises a contacting tab configured to provide an electrical contact between a first electrode of an electrode assembly and a first terminal, as well as a first spacer arrangement arranged between the first end plate and the electrode assembly and configured to secure the electrode assembly in a length direction. The second end plate comprises a current collector and a second spacer arrangement, wherein the second spacer arrangement is arranged to secure the electrode assembly in the length direction and the current collector to secure the electrode assembly in a direction orthogonal to the length direction. A method for assembling such a cell is also disclosed.

20 Claims, 8 Drawing Sheets

(56) References Cited

FOREIGN PATENT DOCUMENTS

| | | |
|---|---|---|
| CN | 113097659 A | 7/2021 |
| DE | 102018130173 A1 | 5/2020 |
| EP | 3748732 A1 | 12/2020 |
| JP | 2019040678 A * | 3/2019 |
| WO | 2019148662 A1 | 8/2019 |

OTHER PUBLICATIONS

International Search Report and Written Opinion for International Application No. PCT/EP2022/073939, dated Dec. 7, 2022, (14 pages), European Patent Office, Rijswijk, Netherlands.
International Search Report and Written Opinion for International Application No. PCT/EP2022/073929, dated Dec. 9, 2022, (16 pages), European Patent Office, Rijswijk, Netherlands.
International Search Report and Written Opinion for International Application No. PCT/EP2022/073924, dated Feb. 27, 2023, (15 pages), European Patent Office, Rijswijk, Netherlands.
International Search Report and Written Opinion for International Application No. PCT/EP2022/073927, dated Feb. 27, 2023, (15 pages), European Patent Office, Rijswijk, Netherlands.

* cited by examiner

SECONDARY CELL

CROSS-REFERENCE TO RELATED APPLICATIONS

The present application claims priority to and the benefit of Swedish Patent Application No. 2151084-7, filed Aug. 30, 2021; and Swedish Patent Application No. 2151119-1, filed Sep. 10, 2021; the entire contents of both of which as are hereby incorporated by reference herein.

BACKGROUND

Technical Field

The present disclosure generally relates to rechargeable batteries, and more specifically to secondary cells and the manufacturing thereof.

Related Art

In addressing climate change there is an increasing demand for rechargeable batteries, for example to enable electrification of transportation and to supplement renewable energy. Currently, lithium-ion batteries are becoming increasingly popular.

Rechargeable or 'secondary' batteries find widespread use as electrical power supplies and energy storage systems. For example, in automobiles, battery packs formed of a plurality of battery modules, wherein each battery module includes a plurality of secondary cells, are provided as a means of effective storage and utilization of electric power.

Each cell may comprise one or more electrode assemblies, in which a positive electrode and a negative electrode are arranged to allow transport of charge carried in an electrolyte arranged therebetween.

Several different form factors exist for the cells applied in secondary batteries depending on their intended application field. In automotive applications, the most common cell types are cylindrical, prismatic and pouch cells.

There are several challenges in the prior art, primarily relating to electrical performance and reliability as well as to scaling and manufacturability.

BRIEF SUMMARY

It is an object of the present invention to address at least some of these challenges, and to provide an improved or alternative secondary cell technique.

In particular, according to a first aspect of the present disclosure, there is provided a secondary cell comprising an electrode assembly and a casing accommodating the electrode assembly. The casing comprises a body, a first end plate and a second end plate, wherein the first and second end plates are arranged on opposite sides of the body with respect to a length direction of the body, and wherein the first end plate comprises a first terminal and the second end plate comprises a second terminal of the secondary cell. The end plates may also be referred to as "lids".

According to a second aspect, the first end plate of the cell according to the first aspect comprises a contacting tab configured to provide an electrical contact between an electrode of the electrode assembly and the first terminal. The first end plate further comprises a spacer arrangement arranged between the first end plate and the electrode assembly, wherein the spacer arrangement is configured to secure the electrode assembly in the length direction of the body.

The spacer arrangement, which in the present disclosure also may be referred to as a protrusion, insulator or bottom insulator, may hence be arranged between at least one of the first and the second end plates and the electrode assembly to mechanically support the electrode assembly along the length direction, thereby preventing or at least reducing sliding movement of the electrode within the casing. The spacer arrangement may be formed as a separate component, which in some examples may be attached to the end plate, for instance by means of a rivet, or simply be placed between the end plate and the electrode assembly during assembly. In further examples, the spacer arrangement may be integrally formed with the lid.

The spacer arrangement may comprise a first and a second spacer element arranged at opposite sides of the contacting tab. The spacer elements may hence be arranged to support the electrode assembly at two separate portions, arranged at opposing sides of the casing.

The contacting tab may be formed of an uncoated edge of the electrode of the electrode assembly, which also may be referred to as an electrode tab or protruding edge of the electrode. Alternatively, the contacting tab is formed by a separate element, such as a sub-tab, which may be electrically connected to the electrode tab and hence serve to prolong the electrode tab to facilitate attachment to the end plate. The use of a sub-tab is particularly beneficial in assemblies where the electrode tabs are too short, i.e., do not protrude enough from the electrode assembly, to allow an efficient attachment to the end plate. By extending the electrode tab with the sub-tab, to thereby form a longer contacting tab, the electrode may more easily be electrically connected to the terminal of the end plate. However, it should be noted that alternative designs are also possible, in which the uncoated area of the electrode is sufficiently large to form an electrode tab long enough to not require any additional sub-tab.

Beneficially, the cross-sectional area of the contacting tab is relatively large to reduce the electrical resistance when conducting current from the electrode assembly to the first terminal. It is understood that the cross-sectional area may be increased by increasing the width of the contacting tab, as seen in a direction extending between the spacer elements and hence orthogonal to the length direction of the casing. The contacting tab may therefore be arranged to extend from the first spacer element to the second spacer element, and the spacer elements may in turn be arranged at a respective end portion of the first end plate. Reducing the width of the spacer elements may further increase the available space for the contacting tab and thus allow for a wider contacting tab and a further reduction in electrical resistance. The width of the contacting tab may in some examples exceed at least half of a corresponding width of the electrode assembly (i.e., as seen in a direction between the first and second spacer element), and preferably be as wide as possible given the available space between the spacer elements.

It will be appreciated that designs including two or more electrode assemblies arranged adjacent to each other in the same housing accordingly may comprise two or more contacting tabs at each terminal side. Hence, each electrode assembly may be connected to the first and second end plate by means of a respective contacting tab as outlined above.

The first end plate may further comprise at least one tab spacer, or tab insulator, arranged on a side of the first end plate facing the electrode assembly. The tab spacer may extend along the contacting tab to electrically insulate the contacting tab from an inner surface of the casing. The tab spacer may hence be electrically insulating. In some examples, the tab spacer may be configured to secure the electrode assembly in the length direction of the body, and may thus have a similar extension in the length direction as the spacer arrangement.

During assembly of the secondary cell, the electrode assembly may be inserted into the body of the casing through the second open end. Further, the contacting tab may be attached to the electrode of the electrode assembly, either prior to or after insertion of the electrode assembly into the casing. The contacting tab may for example be attached to a protruding edge portion, or electrode tab, of the electrode of the electrode assembly, and may thus be referred to as a sub-tab serving to prolong the electrode tab to facilitate attachment to the end plate. The contacting tab, which in the present disclosure also may be referred to as a first contacting means, or form part of the same, may hence be electrically connected to the electrode of the electrode assembly and arranged such that it protrudes from the first open end portion of the body. The assembly may further comprise a step of attaching the contacting tab to the first lid, or a current collector of the first lid, to electrically connect the electrode assembly to the first terminal. In some examples, the contacting tab may be attached to the electrode and the lid after the electrode assembly is inserted into the body. In that case, the contacting tab may be attached to the tab of the electrode in a first step and to the lid in a subsequent step, or vice versa.

Thereafter, the first end plate may be arranged to cover the first open end of the body, and the spacer arrangement arranged between the first end plate and the electrode assembly to secure the electrode assembly in the length direction of the body. When arranging the first end plate to cover the first open end, the contacting tab may be folded so as to fit within the casing. The contacting tab may preferably be folded into a Z-fold. In some embodiments, in which the tabs of the electrode assembly are too short to be possible to Z-fold, the contacting tab may form a sub-tab that is added to the electrode tabs to allow the Z-fold to be formed.

The contacting tab may be attached to the first end plate and/or the tab protruding from the electrode assembly while the first end plate is oriented substantially parallel to the length direction of the body. After the contacting tab has been attached, for example by means of welding or riveting, the end plate may be tilted 90° and fitted over the open end of the body. Beneficially, this allows for the attaching process, such as the welding or riveting of the contacting tab, to be performed while the first end plate is oriented horizontally. This may for instance be the case when the end plate is resting or being supported by a mounting table or conveyor belt. Further, a horizontal arrangement of the first end plate also allows for the attaching process to be performed from above, i.e., by welding, or by a riveting or punching tool arranged above the mounting table or conveyor belt.

Prior to insertion of the electrode assembly into the body, the second electrode of the electrode assembly may be attached to the second end plate to enable electrical connection between the electrode assembly and the second terminal. The attachment may, for instance, be achieved by welding tabs (or protruding, uncoated edges) of the second electrode to a current collector attached to the second end plate, as will be discussed in the following.

The first and second end plates may be sealed to the body to form a substantially fluid tight enclosure preventing electrolyte from escaping the casing. The first end plate may be arranged to extend over a rim of the first open end and attached to the body by means of a sealing extending between the end plate and an outer surface of the body. The sealing may for example be formed by welding a perimeter of the end plate to the edge defining the opening of the body. In different words, a length and width of the end plate may slightly exceed a corresponding length and width of the opening at the open and of the body to allow the edges of the end plate to extend over the rim. Beneficially, this prevents the end plate from entering the body during assembly without requiring a dedicated seat for the end plate to formed on the body, and allows the sealing to be formed from the outside of the casing, in a direction perpendicular to the length direction of the casing. In some examples, the sealing may be formed by means of a welding tool arranged in a plane intersecting the length direction of the casing. As a dedicated seat does not need to be formed, the body may be more easily manufactured, e.g., by extrusion.

In a third aspect, the second end plate of the cell according to the first aspect comprises a current collector arranged to provide an electrical contact between an electrode of the electrode assembly and the second terminal. The current collector may be attached to the electrode to secure the electrode assembly in a direction orthogonal to the length direction of the body. Further, a spacer arrangement may be arranged between the second end plate and the electrode assembly to secure the electrode assembly in the length direction of the body.

The spacer arrangement, which in the present disclosure also may be referred to as a protrusion or insulator, may hence be arranged between the second end plate and the electrode assembly to mechanically support the electrode assembly along the length direction, thereby preventing or at least reducing sliding movement of the electrode within the casing. The spacer arrangement may be formed as a separate component, which in some examples may be attached to the second end plate, for instance by means of a rivet, or simply be placed between the second end plate and the electrode assembly during assembly. In further examples, the spacer arrangement may be integrally formed with the second end plate.

The spacer arrangement and the current collector hence assist in securing the electrode assembly both in the length direction and in a lateral direction, preferably in a plane orthogonal to the length direction.

The current collector may comprise a plate-shaped portion attached to an inner surface of the second end plate. The attachment may for example be formed by a rivet extending through the second end plate and electrically connecting the current collector to the second terminal. Further, the current collector may comprise at least one edge portion protruding towards the electrode assembly to facilitate attachment to the same. The edge portion may be attached to an electrode of the electrode assembly by means of welding. Preferably, the edge portion is electrically connected to a protruding, uncoated edge or tab of the second electrode, such as the cathode electrode, of the electrode assembly.

In some examples, the current collector comprises a first and a second edge portion, or collector leg, extending along the second end plate and substantially parallel to each other. This is beneficial in designs comprising a first and a second electrode assembly, allowing the first edge portion to be attached to the first electrode assembly and the second edge portions to be attached to the second electrode assembly. For secondary cells comprising only one electrode assembly, the current collector may comprise a single edge portion, or leg.

A collector leg may extend along the entire length of the end plate, or at least along the entire electrode tab formed by the uncoated edge region of an electrode, to allow the entire electrode tab to be electrically contacted to the current collector. In alternative designs, the collector leg may extend along only a part of the end plate, thereby limiting the electrical contact region of the electrode tab to the region defined by the extension of the current collector legs.

The spacer arrangement, arranged between the second end plate and the electrode assembly, may be configured differently depending on the design and configuration of the collector legs. In case there are two collector legs extending along the entire electrode tab, the spacer arrangement may be arranged between the collector legs. This configuration requires a spacer arrangement sized to be fitted in the spacing between the two collector legs. In case the collector legs extend along only a part of the electrode tab, the spacer arrangement can be arranged at the side(s) of the current collector. Put differently, the current collector legs may be arranged between a first and second spacer element of the spacer arrangement. Preferably, the current collector legs are arranged to extend along the entire spacing between the first and second spacer element. Similar to the previous case, the width of the spacer arrangement can be adjusted to be smaller than the spacing between the collector legs so that the remaining portions of the electrode tabs (i.e., the portions not forming part of the electrical contact area) can be fitted between the spacer arrangement and the housing. Beneficially, this design leaves a free space for the remaining portions of the electrode tabs and hence eliminates the need for notching of the tabs. Reference is made to the embodiment shown in FIG. 6 for further details.

The spacer arrangement is configured to support the electrode assembly at least in the length direction of the casing, whereas the current collector leg(s) are configured to support the electrode assembly at least in a plane orthogonal to the length direction.

According to a fourth aspect, a secondary cell according to the first aspect is provided, comprising a contacting tab similarly configured as the contacting tab discussed in connection with the second aspect and a current collector similarly configured as the current collector discussed with reference to the third aspect. Hence, the first end plate may comprise a contacting tab configured to provide an electrical contact between a first electrode of the electrode assembly and the first terminal, and a first spacer arrangement arranged between the first end plate and the electrode assembly, wherein the first spacer arrangement is configured to secure the electrode assembly in the length direction of the body. Further, the second end plate may comprise a current collector arranged to provide an electrical contact between a second electrode of the electrode assembly and the second terminal, wherein the current collector is attached to the second electrode to secure the electrode assembly in a direction orthogonal to the length direction of the body, and a second spacer arrangement arranged between the second end plate and the electrode assembly and configured to secure the electrode assembly in the length direction of the body.

The first terminal may for instance form an anode of the secondary cell, and the second terminal a cathode. Consequently, the first electrode may be an anode electrode (also referred to as the negative electrode) and the second electrode a cathode electrode (also referred to as a positive electrode).

The secondary cell may be assembled by inserting the electrode assembly into the body via the second open end and arranging the contacting tab such that it protrudes at the first open end of the body to allow the contacting tab to provide an electrical connection between the first electrode and the first terminal of the first end plate. Further, the first spacer arrangement may be arranged between the first end plate and the electrode assembly to secure the electrode assembly in the length direction of the body. The current collector of the second end plate may be attached to the second electrode to provide electrical contact between the second electrode and the second terminal and to secure the electrode assembly in a direction orthogonal to the length direction of the body. The attaching may be performed before the electrode assembly is inserted into the body. Further, the second spacer arrangement is arranged between the second end plate and the electrode assembly to secure the electrode assembly in the length direction of the body.

The electrode assembly may hence be supported in the length direction between the first and second spacer arrangements, arranged at the respective end of the casing, to prevent the electrode assembly from sliding back and forth therebetween. The welding of the contacting tab to the current collector may also contribute to the support of the electrode assembly in the length direction of the casing.

The combination of the contacting tab, or sub-tab, at the first terminal and the current collector at the second terminal is particularly advantageous in embodiments wherein the coated, or active area of the first electrode of the electrode assembly exceeds or protrudes beyond the coated area of the second electrode of the electrode assembly. Commonly, the coated area taking part in the electrochemical reaction of the cell is larger on the anode electrode than on the cathode electrode to ensure that lithium ions moving from the cathode side hit a surface of active material on the anode side. This reduces the risk of lithium being deposited on the anode electrode. As a consequence, the anode electrode is larger than the cathode electrode and therefore more exposed to the surroundings of the electrode assembly, including structures such as current collectors and Z-folded sub-tabs. Because of the risk of non-fixed or movable parts (such as Z-folded tabs) outside the electrode assembly coming into electrical contact with the anode electrode, it is desirable to avoid Z-folding on the side at which the terminal has a polarity that is opposite the polarity of the anode electrode. Put differently, it is beneficial to arrange the Z-folding at the anode side, where the terminal has the same polarity as the Z-folding. A more static current collector connection, for instance provided by welding the cathode electrode tab directly to the current collector, can be used at the cathode side.

According to a fifth aspect, method for assembling a secondary cell according to the first aspect is provided. The method comprises inserting the electrode assembly into the body via the second open end, attaching a contacting tab, or sub-tab to a first electrode of the electrode assembly, arranging the contacting tab such that it protrudes from the first open end of the body, and attaching the contacting tab to the first end plate. The contacting tab may be attached to the first electrode either prior to or after the insertion of the electrode assembly into the body. The contacting tab is attached to the first end plate while the first end plate is oriented substantially parallel to the length direction of the body. Thereafter, the first end plate is attached to the body by folding the contacting tab and sealing the first end plate to a rim of the casing. Beneficially, the contacting tab may serve to prolong the tabs protruding from the electrode assembly to allow a horizontal assembly process of the first end plate, i.e., an attachment of the contacting tab to the first end plate when the first end plate is oriented horizontally on a mounting table or conveyor belt. The first end plate may then be positioned over the open end by Z-folding the contacting tab. A horizontal arrangement of the first end plate facilitates the attaching process, which for example may involve riveting or welding, as it can be performed from above, i.e., by a tool arranged above the mounting table or conveyor belt.

It will be appreciated that the secondary cell may comprise one or more electrode assemblies, such as two electrode assemblies, connected to a common first and second terminal, respectively.

The electrode assembly may be formed of a first and a second electrode, also referred to as a positive and a negative electrode. The positive and the negative electrode may be formed as a respective conductive sheet with an electrolyte arranged in between. The operation of the cell relies on a charge carrier transport between the positive and the negative electrode, through the electrolyte. The electrolyte may for example be provided in a separator, acting as a physical distancing means keeping the electrodes apart. The electrode assembly (also referred to as a 'jelly roll'), comprising the positive electrode and the negative electrode, may be rolled into a substantially cylindrical roll, or folded into a structure conforming to a cuboid, for instance having a rectangular cross section, suitable for a prismatic cell. In further examples, the electrode assembly may be formed by stacking a plurality of first and second electrodes in a vertical stack, preferably interleaved with a Z-folded separator.

To facilitate electrical connection to the respective terminal, each electrode may comprise an edge portion, or tab, protruding to a respective side of the electrode assembly. The tab may be integrally formed with the electrode, representing an uncoated edge portion of the electrode, and/or comprise a separate tab element that is attached to the electrode edge. The protruding edge portions, or tabs, allow the electrodes to be electrically connected to a respective contacting means, for example comprising the contacting tab (or sub-tab) and the current collector, for providing an electrical contact between the respective electrodes and the respective terminals of the cell. The terminals may be referred to as anode and cathode and may be configured to allow the cell to be electrically connected to other components of the resulting battery, such as other cells.

It will be appreciated that embodiments, features and effects described with reference to a first one of the above aspects may be combined, when applicable, with any of the other aspects described above.

A further scope of applicability of the present invention will become apparent from the detailed description give below. However, it should be understood that the detailed description and specific examples, while indicating preferred embodiments of the invention, are given by way of illustration only, since various changes and modification within the scope of the invention will be apparent to those skilled in the art from this detailed description.

BRIEF DESCRIPTION OF THE FIGURES

One or more embodiments will be described, by way of example only, and with reference to the following figures, in which.

DETAILED DESCRIPTION OF VARIOUS EMBODIMENTS

The above and other aspects of the present invention will now be described in more detail with reference to the appended figures. The figures should not be considered limiting but are instead used for explaining and understanding.

Figure 1:
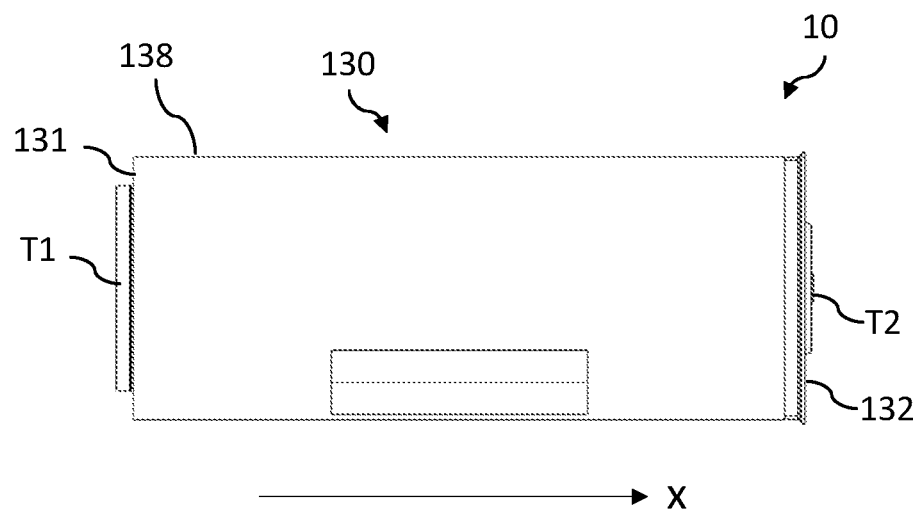
FIG. 1 schematically shows a secondary cell according to an embodiment of the present disclosure.

An illustrating example of an embodiment is shown in FIG. 1, which will be described in the following. FIG. 1 shows a secondary cell 10, in which an electrode assembly, or jellyroll, is arranged in a casing 130. The electrode assembly may be folded, rolled, or stacked depending on the application of the resulting battery, and the secondary cell 10 may thus be of a cylindrical type or a prismatic type.

The casing 130, which also may be referred to as a housing, comprises a body 138 extending along a length direction x, as well as a first and a second end plate 131, 132 attached to the respective end portions of the body 138. The end portions 131, 132 are sealed to the body 138 to form an enclosure capable of retaining an electrolyte in which the electrode assembly may be immersed. The first and second end plates 131, 132 may also be referred to as lids arranged to close open end portions of the body 138. As shown in the present figure, the first and second end plates 131, 132 are arranged at opposite sides of the body 138, with respect to the length direction of the casing.

The first end plate 131 comprises a first terminal T1, which is electrically connected to a first electrode of the electrode assembly, and the second end plate 132 comprises a second terminal T2 connected to a second electrode of the electrode assembly. The first terminal T1 may be referred to as an anode of the cell 10, whereas the second terminal T2 may be referred to as a cathode of the cell 10.

As already mentioned, the electrode assembly may be considered to have a length direction along the x-axis in FIG. 1 (left-right in the figure). The length direction may be understood to extend between a first and a second end portion, or side, of the assembly 110. Consequently, the secondary cell 10 may be referred to as a side terminal cell 10, indicating that the cell 10 during use, such as in an electric vehicle, may be oriented with its terminals T1, T2 pointing to the sides.

The terminals T1, T2 are electrically connected to the respective electrodes of the electrode assembly via contacting means 121, 122 (not shown in FIG. 1), which may be formed of, or attached to, a protruding edge or tab of the respective electrode and to the respective end plates 131, 132. The contacting means 121, 121 and the end plates 131, 132 are described in greater detail in the following.

A method for assembling the secondary cell 10 of FIG. 1 will now be discussed with reference to FIGS. 2a and b. The secondary cell 10 may be assembled by inserting the electrode assembly 110 into the body 138 of the casing 130 via a second open end of the body 138, whereafter the first and second end plates 131, 132 are sealed to the body 138 to form a closed envelope or can. The casing 130 may for example be formed as a cylinder or tube, having a circular or polygonal cross section and a length direction, or axial orientation, along the x-direction extending between the two terminals T1, T2. The secondary cell may thus be a prismatic secondary cell.

The casing 130 may comprise a first and a second open end portion arranged on opposite sides of the body 138, with respect to the length direction, and an outer surface enclosing an interior of the casing. In the present example shown in FIGS. 2a and b, the body 138 of the casing 130 has a shape conforming to a tube having a rectangular cross section and end portions which are open to allow the electrode assembly 110 to be inserted therethrough along the x-axis indicated in FIG. 2a. The body 138 may for example be formed by means of extrusion, for example of a metal. Preferably, the body 138 and the electrode assembly are provided with a similar cross-sectional shape and a similar length to facilitate insertion and accommodation of the electrode assembly 110 in the casing 130.

Figure 2A:
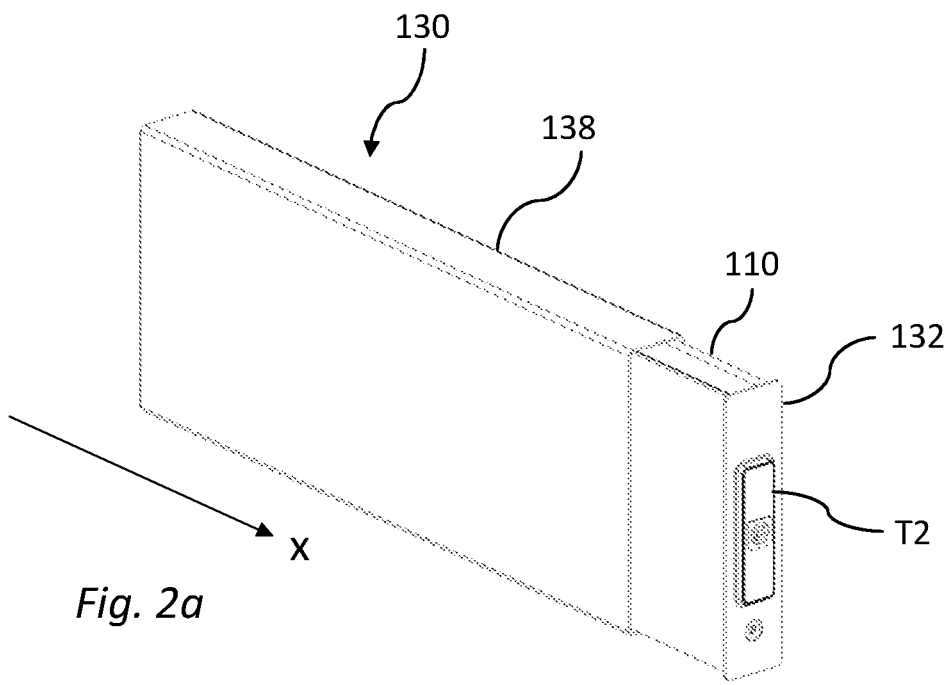
FIG. 2*a* schematically shows an example secondary cell during insertion of the electrode assembly into the body of the casing.
Figure 2B:
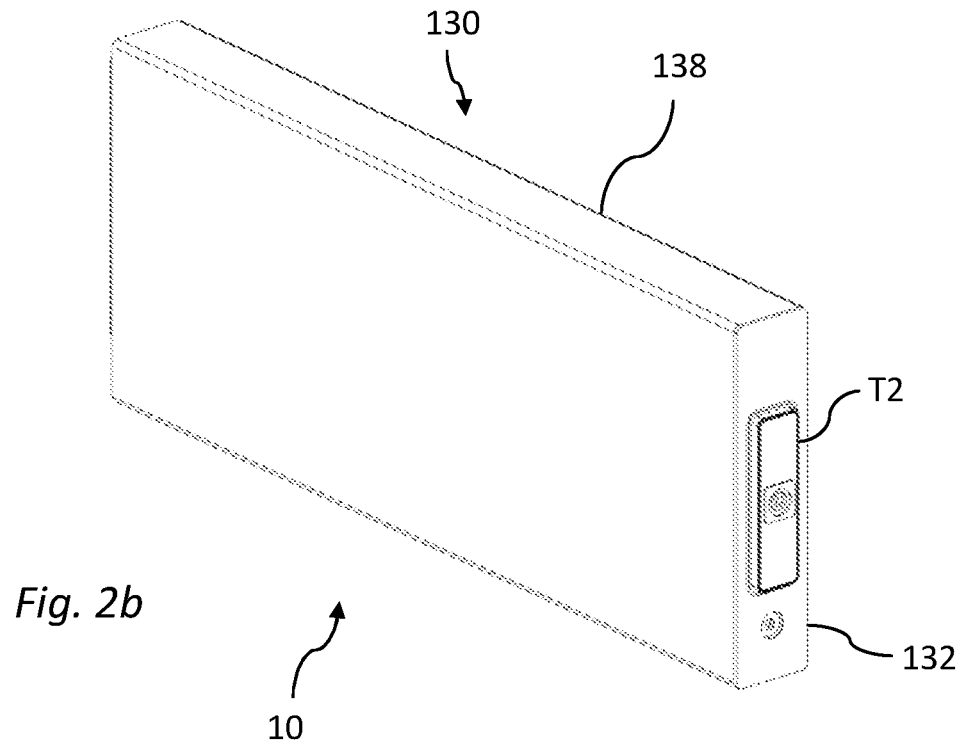
FIG. 2*b* shows the secondary cell in FIG. 2*a* after insertion of the electrode assembly.

As shown in FIGS. 2a and b, the casing 130 and the electrode assembly 110 may be oriented such that the length direction of the casing 130 is aligned with the length direction x of the electrode assembly 110. Although a single electrode assembly 110 is illustrated in the example of FIGS. 2a and b, it will be appreciated that a cell 10 in some examples may comprise two or more electrode assemblies, or jellyrolls 110. The two or more electrode assemblies 110 may for example be arranged to extend parallel to each other, along the x-direction. The first and second terminals T1, T2 may further be common to the two or more electrode assemblies 110, which thus may be connected to the respective terminals T1, T2 via the first and second contacting means 121, 122.

To facilitate the assembly process, a lid or end plate 132, comprising a terminal T2, may be pre-assembled at an end of the electrode assembly 110 prior to insertion into the body housing 130. The terminal T2 of the lid 132 may hence be electrically connected to one of the electrodes of the electrode assembly 110 via a second contacting means 122 (shown in FIGS. 6 and 8) before the electrode assembly 110 is inserted into the body 138. Once inserted, the second end plate 122 may be secured or sealed to the body 138 of the casing 130 in a manner which will be described later.

During the assembly process, the electrode assembly 110 may be inserted into the body 138 through the open end (to the right end of the tube 138 in FIG. 2a). Once inserted, the first contacting means 121, or contacting tab, as well as the first end plate 131 may be arranged at the other open end (to the left of the body 138 in FIGS. 2a and b).

Figure 3:
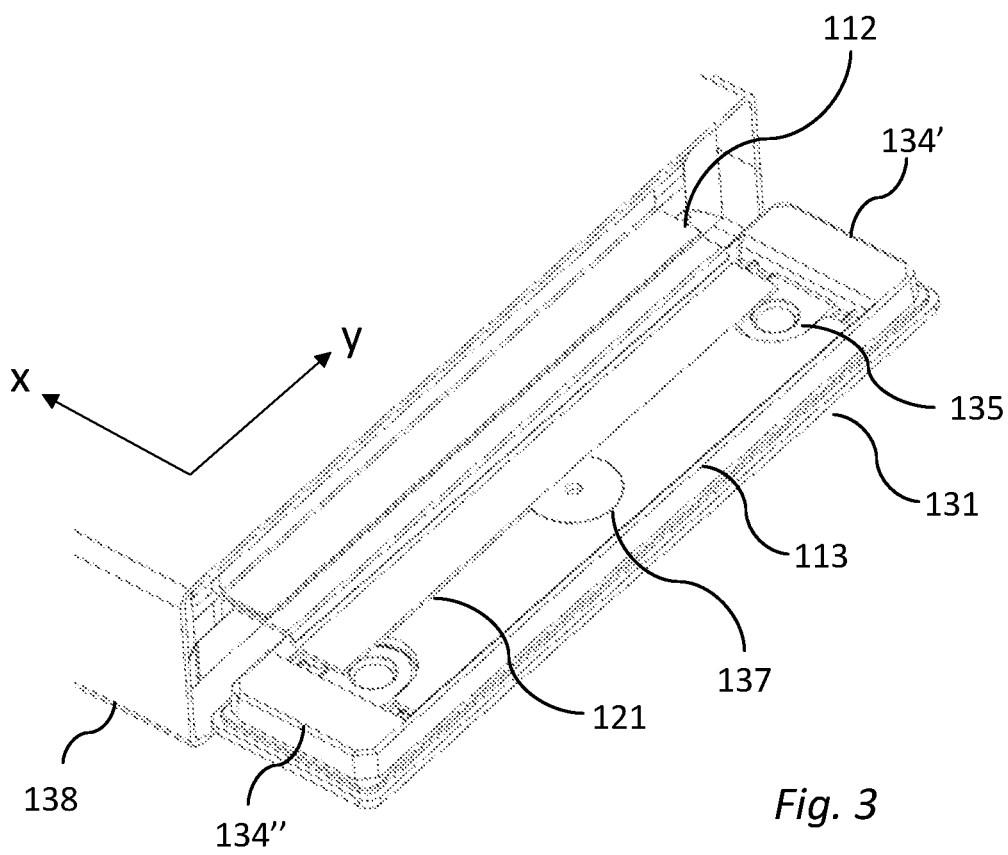
FIG. 3 is a perspective view of the first end plate during assembly of the cell.

FIG. 3 shows the cell 10 after the electrode assembly 110 has been inserted into the body 138 and the contacting tab 121, also referred to as a sub-tab, attached to the first end plate 131. As illustrated, the contacting tab 121 may be arranged to protrude from the open end of the body 138 to facilitate attachment of the contacting tab 121 to the first end plate 131. The contacting tab 121 may for example be welded to riveted to a current collector 113 attached to the end plate 131, and preferably when the first end plate 131 is oriented substantially parallel to the length direction of the body 138. This allows the contacting tab 121 to be welded or riveted to the current collector 113 of the end plate 131 from above, before the end plate 131 is tilted and fitted with the open end of the body 138. In the present example a rivet 137 is used to attach the current collector 113 to the contacting plate 131.

The contacting tab 121 may at a first end portion be attached to a protruding edge 112, or tab, of the first electrode of the electrode assembly and at a second end portion be attached to the current collector 113 of the first end plate 131. The tab 112 of the first electrode may be formed of a protruding, uncoated edge of the electrode or a separate element that is attached to the electrode.

Several different attachment sequences are possible. For example, the contacting tab 121 may first be attached to the first electrode of the electrode assembly, and thereafter to the first end plate 131. In another example, the order may be reversed, such that the contacting tab 121 first is attached to the end plate 131 and thereafter to the first electrode. It is also possible to attach the contacting tab 121 to the first electrode and the first end plate 131 at the same time, in a simultaneous attachment process. In further examples, the contacting tab 121 may be preassembled to the first end plate 131, before the electrode assembly is inserted into the body 138.

The term "contacting means" may hence refer to an arrangement comprising a plurality of elements, such as the contacting tab 121 or sub-tab 121, the protruding edge 112 or electrode tab 121 of the electrode, and the first current collector 113 as discussed above, of which at least some may be formed of a metal sheet or tab of e.g. copper.

The first end plate 131 in FIG. 3 further comprises a spacer arrangement, also referred to as a bottom insulator, comprising a first and a second spacer element 134', 134". The first and second spacer element 134', 134" are arranged at opposite end portions of the first end plate 131 and separated by a spacing in which the contacting tab 121 is arranged. The extension of the contacting tab 121 between the two spacer elements 134', 134" may be referred to as the width of the contacting tab 121, along the y-axis indicated in FIG. 3 (i.e., in a direction orthogonal to the length direction). The width is preferably as great as possible, given the configuration and arrangement of the remaining parts of the end plate 131, to facilitate current conduction and reduce electrical resistance in the current path formed by the contacting tab 121. In the present figure the contacting tab 121 extends all the way from the first spacer element 134' to the second spacer element 134" (without necessarily touching the spacer elements 134', 134"). Hence, the width of the contacting tab 121 may be substantially equal to the spacing between the spacer elements 134', 134".

The spacer elements 134', 134" are arranged to abut or rest against the electrode assembly 110 when the first end plate 131 is attached to the body 138, thereby securing the electrode assembly 110 in the length direction (x-axis) and reducing the risk of the electrode assembly 110 moving within the casing 110. It will be appreciated that the spacer elements 134', 134" may be provided as separate items, which may be attached to, or supported by, the first end plate 131, 132 when assembled. In further examples the spacer elements 134', 134" are integrally formed with the first end plate 131, or a bottom insulator of the end plate 131. The spacer elements 134', 134" may be formed of an electrically insulating material, such as for instance a plastic material.

While the spacer elements 134', 134" illustrated in the present figure may have a shape conforming to a plateau or a quadrilateral puck, it will be appreciated that other configurations are also possible. The spacer elements 134', 134" may for example be shaped as elongated or ridge-shaped structures, similar to the protruding edges of the second current collector as described above. Combinations are possible, wherein such ridge-shaped protrusions are arranged to extend between the two protrusions 134', 134" shown in FIG. 3.

Figure 4A:
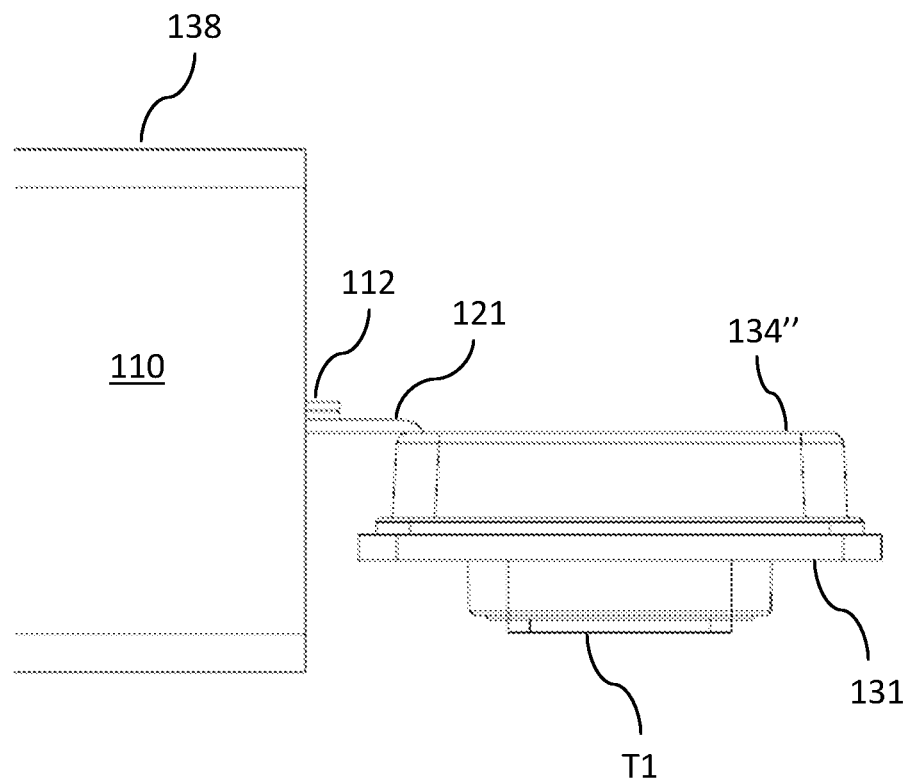
FIGS. 4*a* and *b* are vertical cross sections of the first end plate when arranged horizontally during attachment of the contacting tab.
Figure 4B:
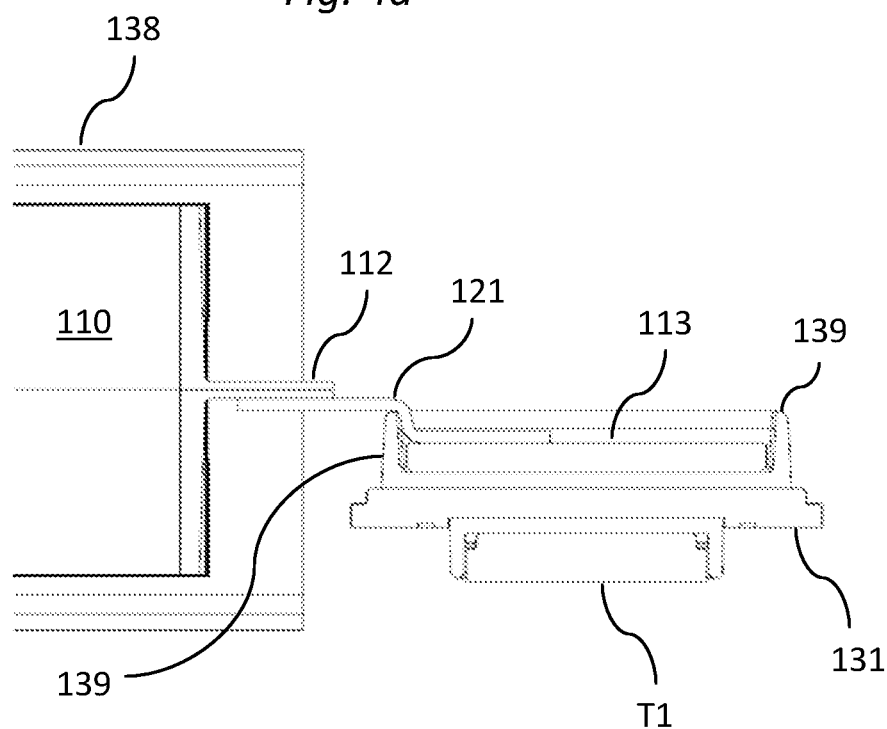
FIG. 4*c* is a vertical cross section showing the first end plate when attached to the body of the casing.

FIG. 4a is a side view of the cell shown in FIG. 3, whereas FIG. 4b is a cross section taken vertically along the x-axis in FIG. 3. FIGS. 4a and 4b show a contacting tab 121, or sub-tab, which at a first end is attached to a protruding edge portion 112, or electrode tab, of the first electrode of the electrode assembly 110, and at a second end is attached to a first current collector 113 at the first end plate 131 to form an electrical path between the electrode assembly 110 and the first terminal T1. The contacting tab 121 is arranged to prolong the electrode tabs 112 in the x-direction to allow the first end plate 131 to be oriented horizontally at the side of the body 138 during the assembly process. When the first end plate 131 is attached to the open end of the body 138, the contacting tab 121 folds to allow the first end plate 131 to be tilted or rotated so as to fit with the rim of the open end of the body 138. As a result, the contacting tab 121 may be folded into a Z-shape, or Z-fold.

Figure 4C:
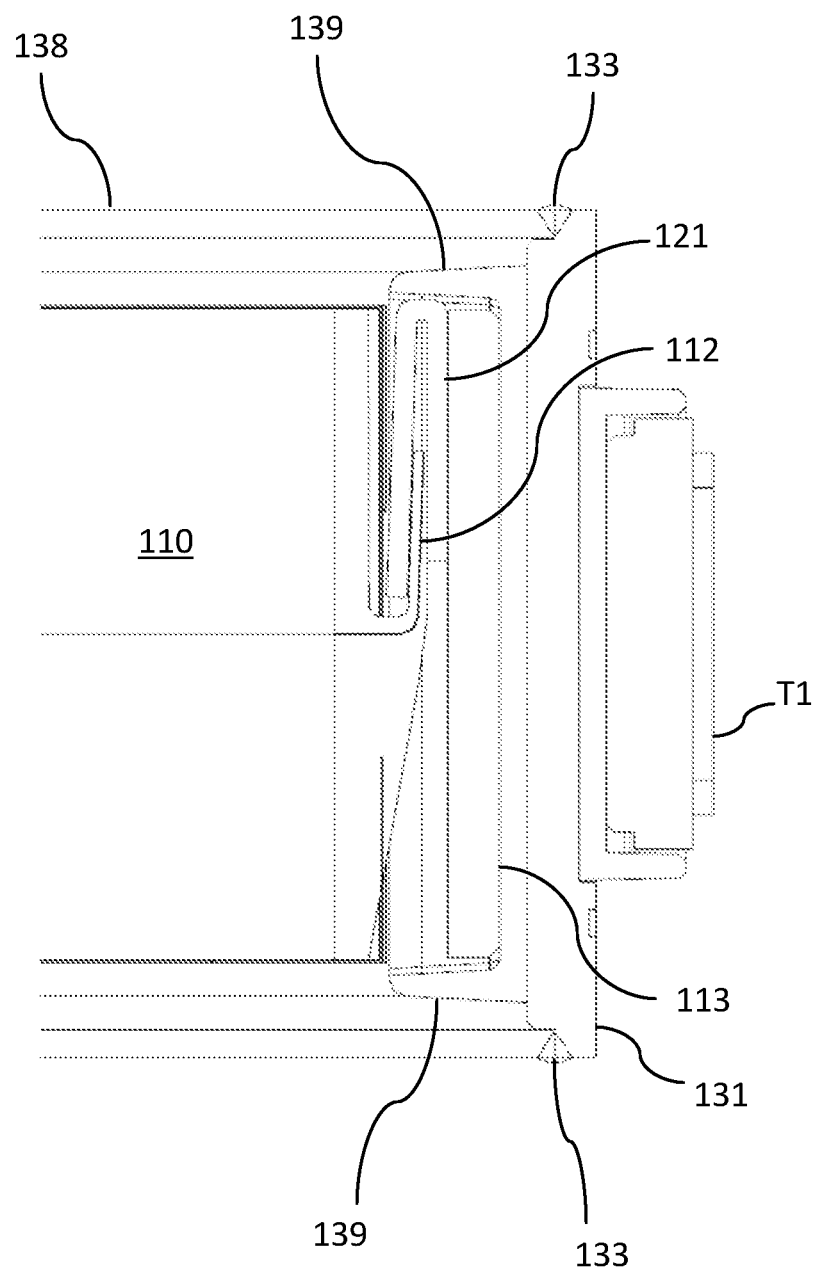

To avoid shortcuts between the folded contacting tab 121 and the inner surface of the body 138, tab spacers or tab insulators 139 may be provided to isolate the contacting tab 121 from the body 138. As indicated in FIG. 4c the tab spacers 139 may be arranged to hinder the contacting tab 121 from touching the body 138, and may thus act as a physical barrier preventing shortcuts. FIG. 4b illustrates an example wherein a first and a second tab spacer 139 extend along the width of the contacting tab 121 along the y-axis in FIG. 3. The tab spacers 139 may be formed by ridge shaped, elongated protrusions arranged at opposite sides of the contacting tab 121. The protrusions 139 may have an extension along the length direction of the casing (i.e., when the end plate 131 is attached to the body) that is similar to the one of the spacer arrangement 134', 134". Put differently, the protrusions 139 may be sufficiently high (as seen in the x-direction of the assembled cell 10) to abut or push against the electrode assembly 110, thereby mechanically stabilizing the electrode assembly 110 in the casing 130 and hindering the electrode assembly 110 from moving back and forth in the casing 130. Alternatively, the tab spacers 139 may be dimensioned to provide a mechanical tolerance, or gap, between the tab spacers 139 and the electrode assembly 110. Such a tolerance may be employed to facilitate manufacturing and allow a slight variation in dimensions of the included parts. In an example, the tolerance may be 1 mm or less, such as e.g. 0.5 mm.

Depending on the height of the tab spacers 139, i.e., how much they protrude from first end plate 131, it may be necessary to form a recess or indentation in the contacting tab 121, in which the protruding tab spacers 139 may be received during the welding of the contacting tab 121 to a contacting means 112 of the electrode assembly 110, such as a protruding edge 112, and/or to a first current collector 113 of the first end plate 131. An example is shown in FIG. 4b, wherein the contacting tab 121 comprises a bent portion for receiving one of the tab spacers 139 when the first end plate is arranged in a horizontal position, parallel to the length direction of the body 138, during welding. After welding, the first end plate 131 may be reoriented by a 90° tilting or rotation, and arranged to cover the end portion of the body 138 with the tab spacers 139 arranged between the (now folded or bent) contacting tab 121 and the inner surface of the casing 130, as shown in FIG. 4c.

In alternative examples (not shown in the drawings), the tab spacers 139 on the inside of the first end plate 131 may be slightly reduced in height to allow for the contacting tab 121 (or any other element of a contacting means interconnecting the electrode assembly and the first terminal T1) to extend between the electrode assembly and the first end plate 131 without having a recess or bent portion for receiving the tab spacer 139. Put differently, the tab spacer 139 may be dimensioned to not interfere with the contacting tab 121 when the end plate is arranged in the horizontal position shown in FIGS. 4a and b.

The body 138 of the casing 130, accommodating the inserted electrode assembly 110, may be arranged to rest, or be supported, horizontally (i.e., with its length direction oriented horizontally) during the assembly process. As shown in for example FIGS. 3 and 4a-b, the first end plate 131 may during the welding of the contacting tab 121 be arranged in a similar manner, such that its inner surface (that is, the surface facing towards the interior of the casing 130 when mounted) extends horizontally. This allows for the casing 130 to be efficiently handled and transported, for example during continuous belt manufacturing, and for the welding to be performed from above (that is, with respect to the direction of gravity).

FIGS. 4a-c show an example wherein the contacting tab 121 is attached to the first end plate 131 by horizontal welding. FIGS. 4a and b show the first end plate 131 (also referred to as lid or end cap), when oriented horizontally, that is, with its inner surface facing upwards so as to facilitate access for the welding tools, whereas FIG. 4c shows the lid 131 when assembled to the open end of the body 138 of the casing, or housing 130. When the lid 131 is rearranged to be fitted with the opening of the housing 130, the contacting tab 121 tends to be folded into a Z-fold between the electrode assembly 121 and the lid, as indicated in the cross section of FIG. 4c.

Figure 5A:
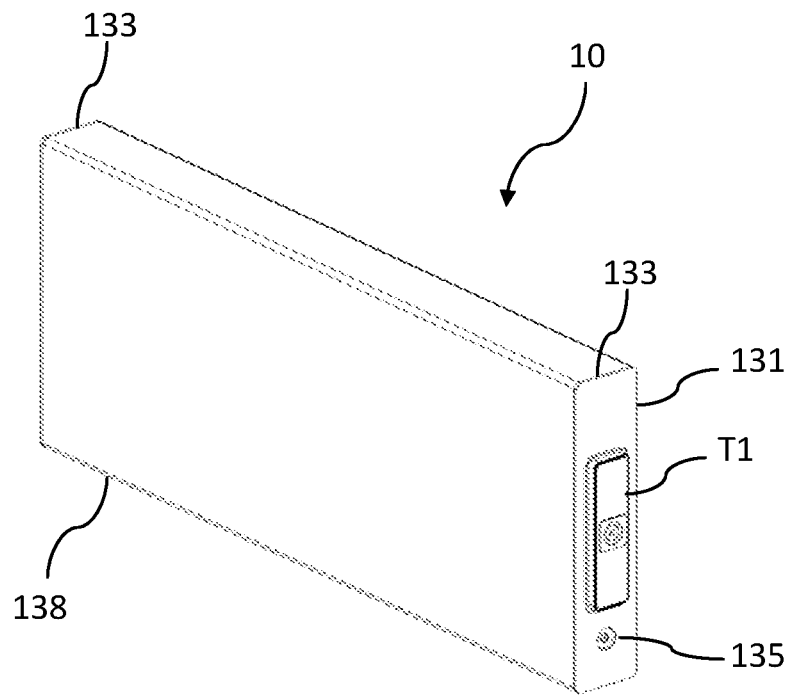
FIG. 5*a* is a perspective view of an assembled secondary cell according to an embodiment of the present disclosure.
Figure 5B:
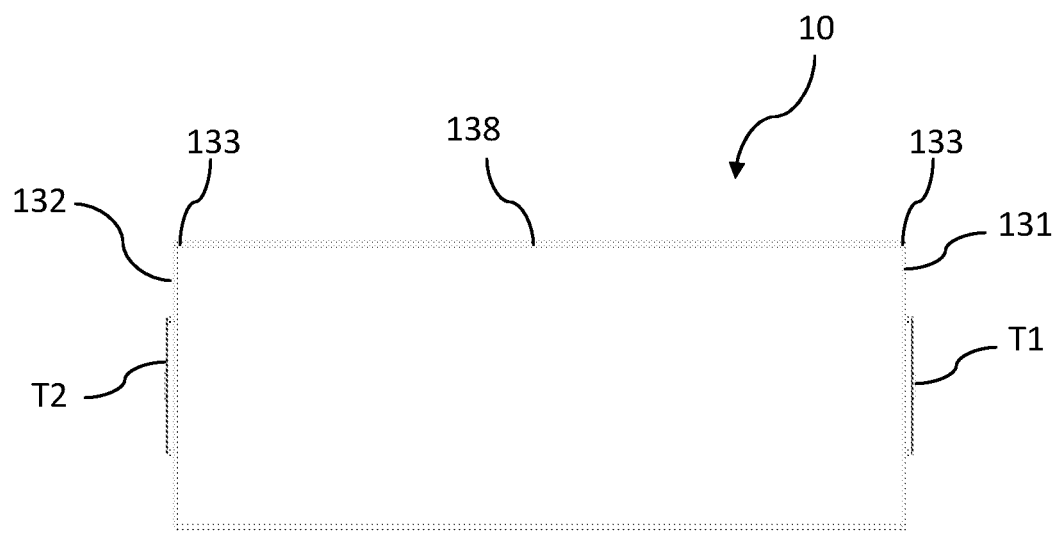
FIG. 5*b* is a side view of the secondary cell in FIG. 5*a*.

FIG. 5a is a perspective view of the assembled secondary cell 10, in which the first and second end plates, or lids 131, 132 have been attached to the body 138 of the casing. A side view of the same cell 10 is shown in FIG. 5b, indicating the relative position of the first and second terminal T1, T2 arranged at their respective end plate 131, 132 at opposite sides of the body 138 with respect to the length direction.

FIG. 5a further shows an inlet port 135 for supplying a fluid electrolyte to the electrode assembly. The inlet port 135 is arranged in the first end plate 131, and aligned with a corresponding passage in the spacer arrangement arranged between the first end plate 131 and the electrode assembly 110 as discussed above.

As illustrated in FIG. 5a, one or both of the lids 131, 132 may form a sealing 133 with the body 138 of the housing 130. Preferably, the sealing 133 is sufficiently tight to protect the interior of the housing 130 from the surrounding environment, and further to retain the electrolyte in the housing 130. The sealing 133 may be formed by welding the lid(s) 131, 132 to the edge of the body 138, as illustrated in FIGS. 4c and 5a-c. The welding may for instance involve laser welding. Although the sealing will be described in connection to the first lid 131 discussed above, it will be appreciated the sealing technique may as well be applied to the second lid 132 arranged at the opposing side of the cell 10.

Figure 5C:
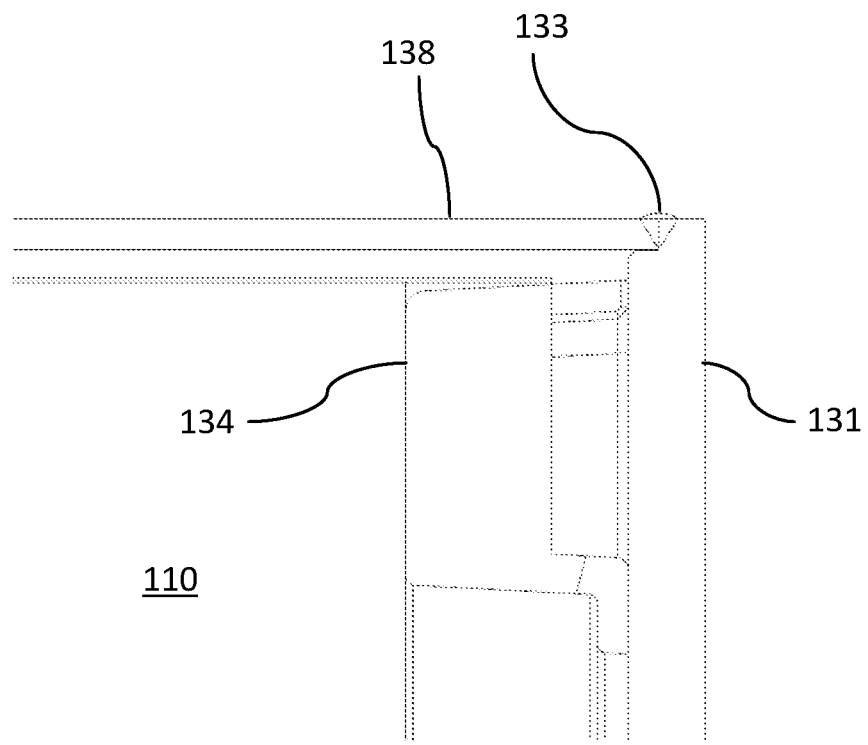
FIG. 5*c* is an enlarged cross section of a portion of an end plate of a secondary cell according to an embodiment.

FIG. 5c shows an example wherein the lid, such as the anode lid 131 and/or the cathode lid 132 is sufficiently large to have an edge extending over the sides, or rim, defining the opening of the body 138 of the housing 130. Put differently, the lid 131,132 may be provided with a length and width that is greater that the corresponding measures of the open ends of the body 138, such that the lid 131, 132 cannot be fitted inside the opening. As a consequence, the sealing 133 between the lid 131, 132 and the housing, such as a weld, can be arranged on an outside of the housing, that is, on its envelope surface. The weld 133 may hence be arranged to extend between the outside of the housing and an edge of the lid. Advantageously, this allows for the welding to be performed from a similar direction as for the welding of the contacting means 121 to the lid 131, such as from above, when the housing 130 rests on a horizontal support, as discussed above. In one example, the housing 130 may be rotated during the welding process to allow the sealing 133 to be easily accessed by a welding tool.

The present embodiment may be contrasted to techniques wherein the lid 131, 132 is arranged inside the housing 130. Such techniques tend to require a support means, such as a rim edge or a protrusion of the housing 130 for keeping the lid 131, 132 in the correct position inside the housing 130 during the welding process. Such kind of support means may be difficult or even impossible to form by an extrusion process. With the present embodiment, there is no need for any support means inside the body 138 of the housing 130 for keeping the lid 131, 132 in place, and the body 138 may therefore be easily and efficiently extruded.

Figure 6:
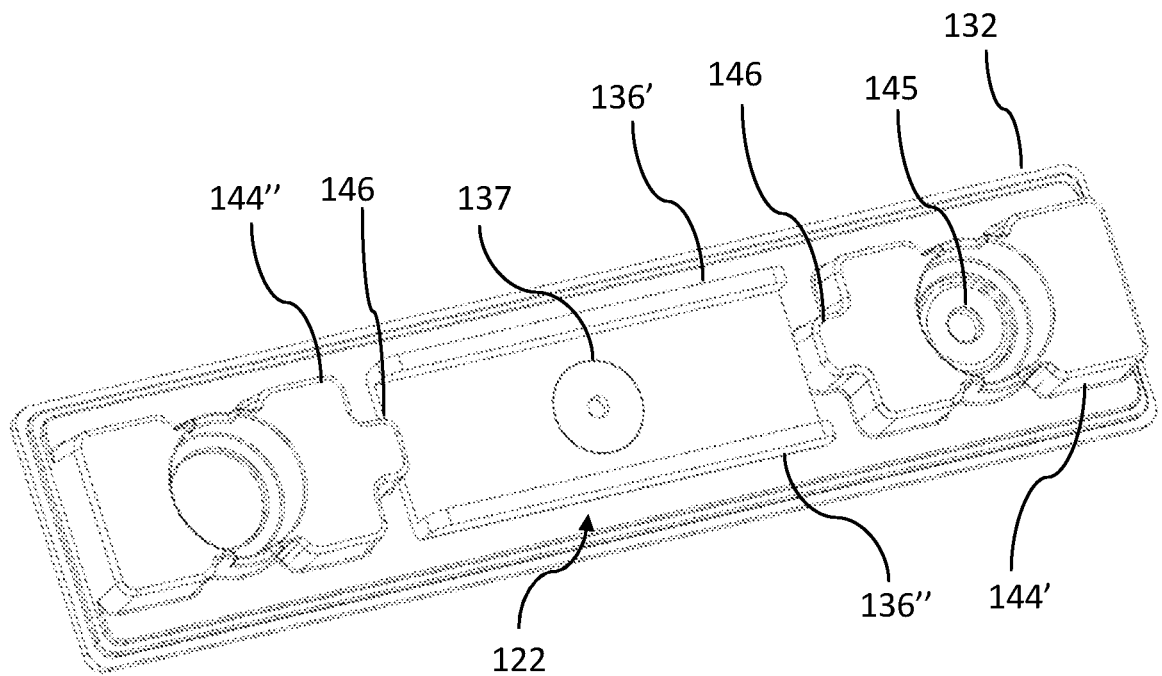
FIG. 6 is a perspective view of a second end plate according to an embodiment of the present disclosure.

FIG. 6 shows an example of a second end plate 132 (also referred to as lid, or cap), which for example may be a cathode end plate 132 similar to the ones described above with reference to FIGS. 1, 2 and 5b-c. The lid 132 comprises a second spacer arrangement 144 (also referred to as an insulator or projecting structure), arranged on the side of the second end plate 132 facing the interior of the housing 130 when assembled. Similar to the above-described first spacer arrangement 131, the second spacer arrangement 144 may be attached to the lid 132, integrally formed with the lid 132, or provided as a separate component between the lid 132 and the electrode assembly 110. The second spacer arrangement 144 may in some examples be arranged to protrude from a surface of the of the lid 132, and the lid 132 may in some examples comprise a plate-like structure onto which the second spacer arrangement 144 is arranged.

The second spacer arrangement 144 is arranged to act as a physical distancing means, providing a distance or gap between the electrode assembly 110 and the remaining part of the lid 132. The second spacer arrangement 144 is hence dimensioned to rest against or abut a portion of the electrode assembly 110 when attached to the housing 130, thereby providing mechanical support to the electrode assembly 110. The second spacer arrangement 144 may exert a force on or bias the electrode assembly 110 towards the opposing end portion of the housing 130, i.e., in the length direction x, when mounted to the end portion of the housing 130, thereby hindering the electrode assembly 110 from moving back and forth within the housing 130.

The lid 132 illustrated in FIG. 6 comprises at least two spacer elements 144', 144", or mechanical stops, for fixating the electrode assembly 110 (or electrode assemblies) in the length direction of the housing 130. The structure and function of the second spacer arrangement 144 may be similar to the ones of the first spacer arrangement 134 described above.

Additionally, or alternatively the spacer arrangement 144 may function as an electrical isolator separating the electrode assembly from the housing 130 and/or portions of the lid 132. The electrically insulating effect may be achieved by means of the physical distancing resulting from the electrode assembly 110 being fixated by the spacer arrangement 144 as described, and/or by the spacer elements 144', 144" being formed of an electrically insulating material.

Further, the lid 132 comprises a through-hole or inlet port 145 allowing electrolyte to be supplied to the interior of the housing. In FIG. 6, a first one of the spacer elements 144' comprises an inlet port 145 which is aligned with a corresponding inlet port in the end plate 132, allowing the interior of the casing 130 to be accessed from the outside.

FIG. 6 further shows a second current collector 122, such as a U-shaped plate or C-channel, arranged on the side of the lid 132 facing towards the electrode assembly 110 when mounted to the end portion of the body 138 of the housing 130. The second current collector 122 may for example comprise a first and a second protruding edge or flange 136', 136", forming the legs of the U-shape, pointing towards the electrode assembly 110 when the lid 132 is mounted and extending along the y-axis. The current collector 122 is arranged between the first and second spacer elements 144', 144" and is configured to be electrically connected to the tabs 124 of a respective electrode assembly 110. In the present case, the first protruding edge 136' may be connected to a first electrode assembly and the second protruding edge 136" to a second electrode assembly arranged inside the housing. The current collector 122 is electrically connected to a terminal T2 of the lid 132 so as to allow for the electrode assemblies to be electrically accessed. The electrical connection may for example be provided by means of a rivet 137 extending through the lid 132.

The current collector 122 may extend along a relatively large portion of the second end plate 132, as seen in a direction extending between the first and second spacer elements 144', 144" (i.e., the y-axis). Preferably, the current collector 122 may extend along the entire gap between the first and second spacer elements 144', 144" (without necessarily touching the spacer elements 144', 144"). In different words, a width of the current collector 122 may correspond to the spacing between the spacer elements 144', 144".

In the present example, the spacer elements 144', 144" comprise a respective guiding portion 146 protruding towards the current collector 122 to facilitate a correct orientation of the current collector 122 (with respect to the x-axis) during assembly. The guiding portions 146 may thus provide a temporary fixation of the current collector 122 before it is permanently attached to the second end plate 132 by e.g. riveting.

Figure 7:
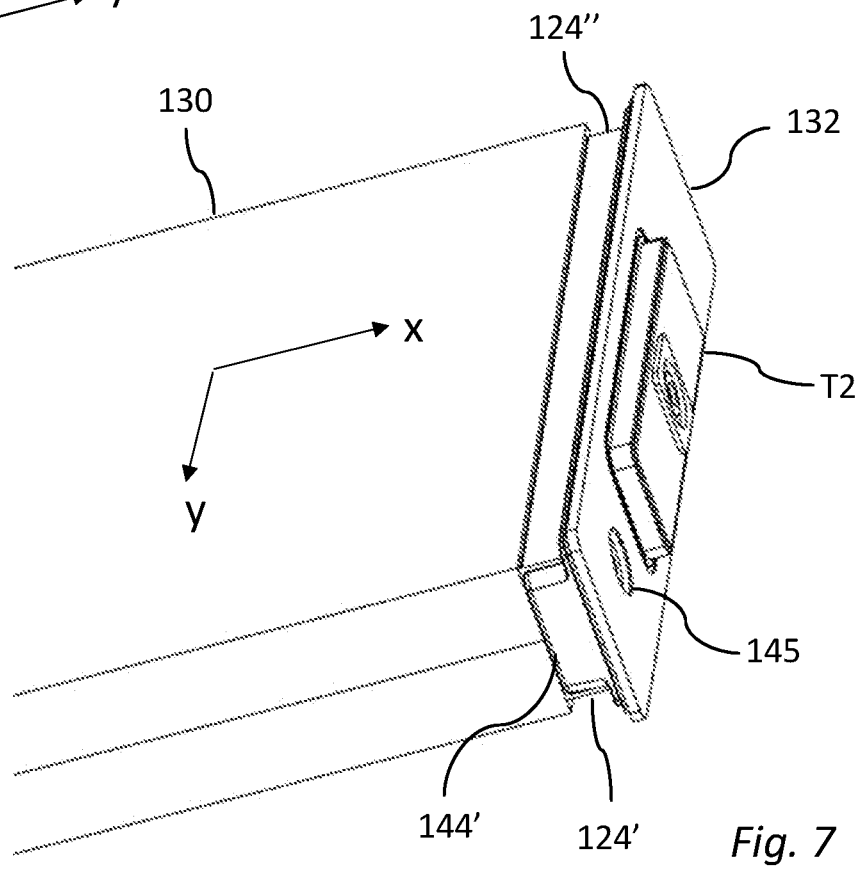
FIG. 7 is a perspective view of an assembled secondary cell according to an embodiment.

The protruding edges, or flanges 136', 136" of the second current collector 122 are configured to be attached to a correspondingly protruding edge of flange 124 of the second electrode of the respective electrode assemblies (see FIG. 7). The protruding edges 136', 136" may preferably be welded to the electrode assemblies. By attaching the electrode assemblies to the current collector 122, the electrode assemblies may be mechanically supported by the current collector 122 at least in a plane orthogonal to the length direction of the housing 130. By combining the attachment to the current collector 122 with the spacer elements 144', 144" the electrode assemblies may be secured in all three dimensions.

The protruding edges 136', 136" and the spacer elements 144', 144" protrude in a direction away from the surface of the second end plate 132 facing the interior of the casing 130. For the purpose of the present disclosure, the extent of the protrusion may be referred to as the 'height' of the edges and the spacer elements along the x-axis (of the assembled cell). In some embodiments, the protruding edges 136', 136"

may have the same height as the spacer elements 144', 144" to assist in securing the electrode assembly along the length direction of the casing 130. In other embodiments, the protruding edges 136', 136" may have a height that is less than the height of the spacer elements 144', 144", thereby ensuring that a major part of the load (from the electrode assembly abutting the second end plate 132) is carried by the spacer elements 144', 144" rather than the protruding edges 136', 136".

It will further be appreciated that the spacer elements 144', 144" may have an extension in the z direction, i.e., between the tabs 124', 124" of the electrode assemblies, allowing the spacer elements 144', 144" to be arranged between the tabs 124', 124". This is further illustrated in FIG. 7, indicating the spacer elements 144', 144" being arranged between the two tabs 124', 124" of the electrode assemblies. With this arrangement, the electrode tabs 124', 124" are allowed to extend along the entire width of the assembly.

The present example shown in FIGS. 6 and 7, in which the spacer elements 144', 144" are used for providing mechanical support to the electrode assembly at the cathode side of the electrode assembly, may be combined with the folded configuration of the contacting tab 121 at the anode side as illustrated above in connection with FIG. 4*c*. Advantageously, the spacer elements 134', 134", 144', 144" may be used for slightly biasing or at least locking the electrode assembly between the first and second end plates 131, 132 to reduce movement of the electrode assembly within the housing 130. However, it will be appreciated that the example in FIG. 4*c* as well as FIG. 6 may be implemented independently from each other.

Figure 8:
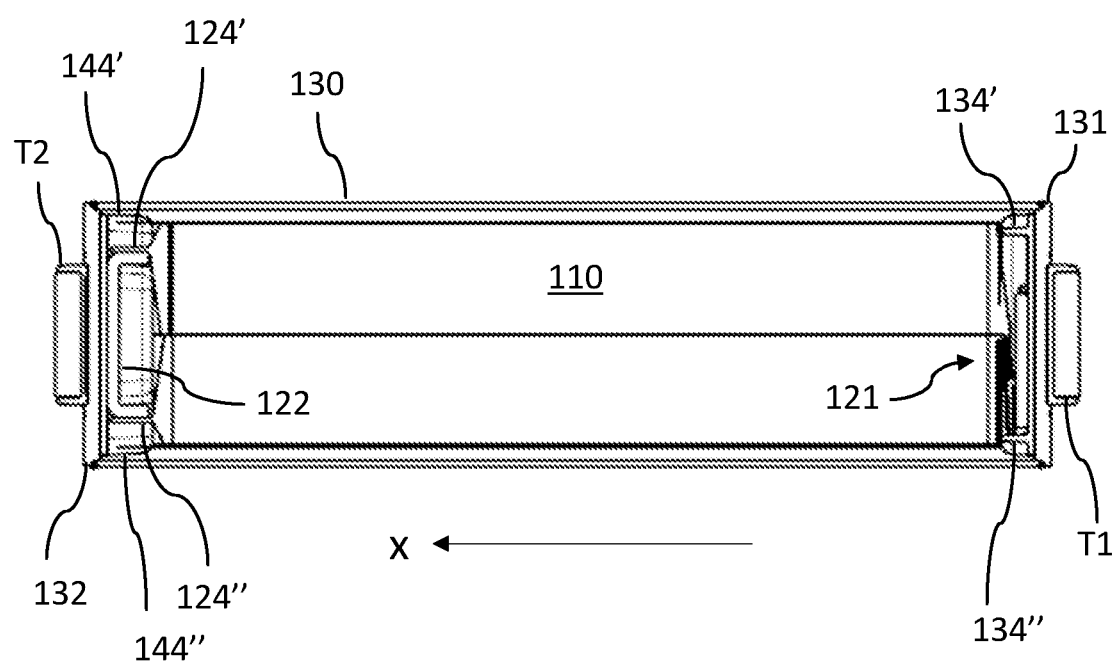
FIG. 8 is a vertical cross section of a secondary cell according to an embodiment.

An example of such a combined use is illustrated in FIG. 8, which shows a cross section of a prismatic cell 10, taken along the length direction of the body 138 of the casing 130. The cell 10 may be similarly configured as the examples described in any of the above FIGS. 1-6. Thus, the cell 10 may comprise one or several electrode assemblies 110 arranged inside a housing 130, which for example may be formed as a tube having a polygonal, such as rectangular or quadratic cross section. The housing may be formed of an elongated body 138, extending in a length direction between a first and a second opening which are closed or sealed by a first and a second lid 131, 132. The lids 131, 132 are arranged to cover or overlap with the rim of the respective opening of the body 138 and sealed to an outside surface of the housing by means of a sealing 133. The respective lids 131, 132 may for instance be welded to the outside surface of the housing 130.

At a first end of the cell, such as the anode end, the first electrode of the electrode assembly 110 may be electrically connected to the first terminal T1 via a folded contacting means 121. The folded contacting means 121 may comprise a conducting plate or sheet forming a contacting tab having a length that allows for the contacting tab to be attached to the lid 131 when the lid 131 is arranged horizontally, i.e., rotated or tilted 90° compared to the orientation shown in FIG. 8. This to facilitate welding of the contacting tab to the inside of the lid 131. The contacting tab may preferably be welded to a first current collector attached to the lid 131. Further, the lid 131 may comprise tab spacers 139 arranged to mechanically support the electrode assembly and/or provide electrical insulation between the folded contacting means 121 and the housing 130.

At a second end of the cell, such as the cathode end, the electrode assembly 110 is mechanically supported by the second spacer arrangement arranged at the inside of the lid 132, i.e., the side of the lid 132 facing the interior of the housing 130 when mounted. The lid 132 may in the present example comprise two spacer elements 144', 144", mechanically supporting the electrode assembly 110 at two different sides (upper and lower sides in FIG. 8). The contacting means 122, for instance comprising a second current collector, is arranged between the spacer elements 144', 144", providing an electrical connection between a second electrode of the electrode assembly 110 and a terminal T2 of the cell 10 as discussed above in connection with e.g. FIG. 6. Thus, the protruding edges of the current collector 122 may be welded to a respective tab 124', 124" of the second electrode of the electrode assembly 110 to secure the electrode assembly 110 at least in the plane orthogonal to the x-axis. The present embodiment represents a beneficial combination of a Z-folded anode side and a U-shaped current collector at the cathode side, wherein the Z-fold provides flexibility during the assembly process and the U-shaped current collector a mechanical support of the electrode assembly.

An itemized list of embodiments follows immediately below.

In one exemplary embodiment a secondary cell is provided that comprises an electrode assembly that itself comprises: a housing accommodating the electrode assembly, the housing comprising a first end portion and a second end portion arranged on opposite sides of the housing, with respect to a length direction of the housing, and an outer surface enclosing an interior of the housing, wherein the second end portion is configured to allow the electrode assembly to be inserted into the interior of the housing through said second end portion; a first lid comprising a first terminal electrically connected to a first electrode of the electrode assembly and a second lid comprising a second terminal electrically connected to a second electrode of the electrode assembly, wherein the first lid is arranged at the first end portion of the housing and the second lid is arranged at the second end portion of the housing; wherein at least one of the first and the second lids extends over a rim defining an opening of the first and/or second end portion, and wherein said lid is sealed to the outer surface of the housing by means of a sealing arranged between the outer surface and said lid.

In a second exemplary embodiment, a method is provided for assembling a secondary cell comprising a housing and an electrode assembly, the method comprising: inserting the electrode assembly into the housing through a second end portion of the housing, such that a first contacting means, electrically connected to a first electrode of the electrode assembly, protrudes from a first end portion of the housing, the first and second end portions being arranged at an opposite sides of the housing with respect to a length direction of the housing; attaching the first contacting means to a first lid comprising a first terminal for electrically contacting the first electrode, wherein the housing and an inner surface of the lid during the attaching of the first contacting means to the first lid are arranged such that the length direction of the housing and an inner surface of the first lid are substantially parallel. This embodiment may further comprise inserting the first lid in the housing by folding the first contacting means and/or sealing the first lid to a rim of the housing.

In a third exemplary embodiment a method is provided for assembling a secondary cell comprising a housing and an electrode assembly, the method comprising: inserting the electrode assembly into the housing through a second end portion, such that a first contacting means, electrically connected to a first electrode of the electrode assembly, protrudes from a first end portion of the housing, the first and second end portions being arranged at opposite sides of the housing with respect to a length direction of the housing; attaching the first contacting means to a first lid comprising a first terminal for electrically contacting the first electrode, arranging the first lid to extend over a rim defining an opening of the first end portion, and sealing the lid to the housing by forming a sealing between the lid and an outer surface of the housing.

In a fourth exemplary embodiment, a secondary cell is provided that includes an electrode assembly; a housing accommodating the electrode assembly, the housing comprising a first end portion and a second end portion arranged on opposite sides of the housing, with respect to a length direction of the housing; a first lid comprising a first terminal electrically connected to a first electrode of the electrode assembly and a second lid comprising a second terminal electrically connected to a second electrode of the electrode assembly, wherein the first lid is arranged at the first end portion of the housing and the second lid is arranged at the second end portion of the housing; wherein at least one of the first and the second lids comprises a protrusion arranged to rest against the electrode assembly to mechanically support the electrode assembly along the length direction when assembled.

In a fifth exemplary embodiment, a secondary cell is provided, comprising: an electrode assembly; a housing accommodating the electrode assembly, the housing comprising a first end portion and a second end portion arranged on opposite sides of the housing, with respect to a length direction of the housing; a first lid comprising a first terminal electrically connected to a first electrode of the electrode assembly and a second lid comprising a second terminal electrically connected to a second electrode of the electrode assembly, wherein the first lid is arranged at the first end portion of the housing and the second lid is arranged at the second end portion of the housing; wherein the first terminal is electrically connected to the electrode assembly by a folded contacting means extending between the electrode assembly and the first lid; and wherein the first lid comprises a protrusion arranged to face the electrode assembly and provide an electrical insulation between the folded contacting means and the housing.

The above-itemized list of embodiments should be understood as being exemplary and non-limiting in nature. As a result, additional and alternative embodiments may be provided as detailed through herein, all considered within the scope of the present invention.

The invention claimed is:

1. A secondary cell, comprising:
an electrode assembly; and
a casing accommodating the electrode assembly;
wherein:
the casing comprises a body, a first end plate and a second end plate, wherein the first and second end plates are arranged on opposite sides of the body with respect to a length direction of the body, and wherein the first end plate comprises a first current collector electrically connected to a first terminal of the secondary cell, and wherein the second end plate comprises a second terminal of the secondary cell;
the first end plate comprises:
a contacting tab configured to provide an electrical contact between a first tab of an anode electrode of the electrode assembly and the first current collector; and
a first spacer arrangement comprising a first and a second spacer element arranged between the first end plate and the electrode assembly and on opposite sides of the contacting tab, wherein the first and second spacer elements are configured to secure the electrode assembly in the length direction of the body;
the second end plate comprises:
a second current collector arranged to provide an electrical contact between a second tab of a cathode electrode of the electrode assembly and the second terminal, wherein the second current collector is attached to the second tab of the cathode electrode to secure the electrode assembly in a plane orthogonal to the length direction of the body; and
a second spacer arrangement arranged between the second end plate and the electrode assembly and configured to secure the electrode assembly in the length direction of the body; and
the second current collector comprises a plate-shaped portion attached to an inner surface of the second end plate and at least one edge portion protruding towards the electrode assembly.

2. The secondary cell according to claim 1, wherein the contacting tab extends from the first spacer element to the second spacer element.

3. The secondary cell according to claim 1, wherein the first end plate further comprises at least one inlet port configured to allow an electrolyte to be supplied to the electrode assembly, and wherein the at least one inlet port extends from an outside of the first end plate and through the first spacer arrangement along the length direction of the body.

4. The secondary cell according to claim 1, wherein the first end plate further comprises at least one tab spacer arranged on a side of the first end plate facing the electrode assembly and extending along the contacting tab to electrically insulate the contacting tab from a sidewall of the casing.

5. The secondary cell according to claim 4, wherein the at least one tab spacer is configured to secure the electrode assembly in the length direction of the body.

6. The secondary cell according to claim 1, wherein the second tab of the cathode electrode is welded to the at least one edge portion.

7. The secondary cell according to claim 1, wherein the second current collector comprises a first and a second edge portion protruding towards the electrode assembly, wherein the first and second edge portions extend along the second end plate and parallel to each other.

8. The secondary cell according to claim 7, wherein the second current collector is formed of a U-shaped plate.

9. The secondary cell according to claim 7, wherein the second spacer arrangement comprises a pair of spacer elements, and wherein the first and second edge portions of the second current collector are arranged between the pair of spacer elements.

10. The secondary cell according to claim 9, wherein the second tab of the cathode electrode is formed by an uncoated edge portion of the cathode electrode, and wherein the second tab extends along the entire first spacer element, the second current collector and the entire second spacer element.

11. The secondary cell according to claim 9, wherein each of the spacer elements comprises a guiding portion protruding towards the second current collector to align the second current collector during assembly.

12. The secondary cell according to claim 1, wherein the at least one edge portion and the second spacer arrangement have the same extension in the length direction of the body.

13. The secondary cell according to claim 1, wherein the second end plate further comprises a second inlet port configured to allow an electrolyte to be supplied to the electrode assembly, and wherein the second inlet port extends from an outside of the second end plate and through the second spacer arrangement.

14. A method for assembling a secondary cell comprising an electrode assembly accommodated in a casing, wherein the casing comprises a body, a first end plate arranged at a first open end of the body and a second end plate arranged at a second open end of the body, wherein the first and second open ends are arranged at opposite sides of the body with respect to a length direction of the body, the method comprising:
inserting the electrode assembly into the body via the second open end;
attaching a contacting tab to a first tab of an anode electrode of the of the electrode assembly and to a first current collector, electrically connected to a first terminal of the first end plate to provide electrical contact between the anode electrode and the first terminal;
arranging a first spacer arrangement, comprising a first and a second spacer element, between the first end plate and the electrode assembly and on opposite sides of the contacting tab, thereby securing the electrode assembly in the length direction of the body;
attaching a second current collector to a second tab of a cathode electrode of the electrode assembly and to the second end plate to provide electrical contact between the cathode electrode and a second terminal of the second end plate and to secure the electrode assembly in a plane orthogonal to the length direction of the body;
arranging a second spacer arrangement between the second end plate and the electrode assembly to secure the electrode assembly in the length direction of the body;
arranging the contacting tab such that it protrudes from the first open end of the body; and
attaching the contacting tab to the first current collector of the first end plate while the first end plate is oriented substantially parallel to the length direction of the body.

15. The method according to claim 14, further comprising arranging at least one tab spacer arranged on a side of the first end plate facing the electrode assembly to electrically insulate the contacting tab from a sidewall of the casing.

16. The method according to claim 14, wherein the contacting tab is attached to the anode electrode before the electrode assembly is inserted into the body.

17. The method according to claim 14, wherein the second current collector is attached to the cathode electrode before the electrode assembly is inserted into the body.

18. The method according to claim 14, further comprising attaching the first end plate to the body by folding the contacting tab and sealing the first end plate to a rim of the casing.

19. A secondary cell, comprising:
an electrode assembly; and
a casing accommodating the electrode assembly;
wherein:
the casing comprises a body, a first end plate and a second end plate, wherein the first and second end plates are arranged on opposite sides of the body with respect to a length direction of the body, and wherein the first end plate comprises a first current collector electrically connected to a first terminal of the secondary cell, and wherein the second end plate comprises a second terminal of the secondary cell;
the first end plate comprises:
a contacting tab configured to provide an electrical contact between a first tab of an anode electrode of the electrode assembly and the first current collector; and
a first spacer arrangement comprising a first and a second spacer element arranged between the first end plate and the electrode assembly and on opposite sides of the contacting tab, wherein the first and second spacer elements are configured to secure the electrode assembly in the length direction of the body;
the second end plate comprises:
a second current collector arranged to provide an electrical contact between a second tab of a cathode electrode of the electrode assembly and the second terminal, wherein the second current collector is attached to the second tab of the cathode electrode to secure the electrode assembly in a plane orthogonal to the length direction of the body; and
a second spacer arrangement arranged between the second end plate and the electrode assembly and configured to secure the electrode assembly in the length direction of the body; and
the second current collector comprises a first and a second edge portion protruding towards the electrode assembly, wherein the first and second edge portions extend along the second end plate and parallel to each other.

20. The secondary cell according to claim 19, wherein at least one of:
the second current collector is formed of a U-shaped plate;
the second spacer arrangement comprises a pair of spacer elements, or
the first and second edge portions of the second current collector are arranged between the pair of spacer elements.

* * * * *

UNITED STATES PATENT AND TRADEMARK OFFICE
CERTIFICATE OF CORRECTION

PATENT NO. : 11,888,182 B2
APPLICATION NO. : 17/898021
DATED : January 30, 2024
INVENTOR(S) : Seungho Kwak It is certified that error appears in the above-identified patent and that said Letters Patent is hereby corrected as shown below:

In the Claims

In Column 19, Line 22, Claim 14, delete "of the of the" and insert -- of the --, therefor.

Signed and Sealed this
Twenty-fifth Day of June, 2024

Katherine Kelly Vidal
*Director of the United States Patent and Trademark Office*